(12) United States Patent
Wang et al.

(10) Patent No.: US 12,114,092 B2
(45) Date of Patent: Oct. 8, 2024

(54) DUAL GAIN COLUMN STRUCTURE FOR COLUMN POWER AREA EFFICIENCY

(71) Applicant: OMNIVISION TECHNOLOGIES, INC., Santa Clara, CA (US)

(72) Inventors: Rui Wang, San Jose, CA (US); Hiroaki Ebihara, San Jose, CA (US)

(73) Assignee: OMNIVISION TECHNOLOGIES, INC., Snata Clara, CA (US)

( * ) Notice: Subject to any disclaimer, the term of this patent is extended or adjusted under 35 U.S.C. 154(b) by 107 days.

(21) Appl. No.: 18/171,227

(22) Filed: Feb. 17, 2023

(65) Prior Publication Data

US 2024/0284074 A1    Aug. 22, 2024

(51) Int. Cl.
*H04N 25/78* (2023.01)
*H04N 25/77* (2023.01)

(52) U.S. Cl.
CPC ............. *H04N 25/78* (2023.01); *H04N 25/77* (2023.01)

(58) Field of Classification Search
CPC ................................. H04N 25/78; H04N 25/77
USPC ........................................................... 348/308
See application file for complete search history.

(56) References Cited

U.S. PATENT DOCUMENTS

| | | | | |
|---|---|---|---|---|
| 8,686,339 B2 * | 4/2014 | Mabuchi | ........... | H01L 27/14806 257/292 |
| 9,055,250 B2 * | 6/2015 | Park | ........... | H04N 25/78 |
| 9,774,811 B1 * | 9/2017 | Ebihara | ........... | H03K 5/249 |
| 10,356,351 B1 * | 7/2019 | Ebihara | ........... | H04N 25/616 |
| 11,343,449 B2 * | 5/2022 | Paik | ........... | H04N 25/75 |
| 11,418,734 B1 * | 8/2022 | Wang | ........... | H04N 25/60 |
| 11,445,141 B2 * | 9/2022 | Lee | ........... | H04N 25/59 |
| 11,503,229 B2 * | 11/2022 | Jung | ........... | H04N 25/78 |
| 11,528,439 B2 * | 12/2022 | Kim | ........... | H04N 25/59 |
| 11,671,728 B2 * | 6/2023 | Hanzawa | ........... | H04N 25/79 348/301 |
| 11,716,549 B2 * | 8/2023 | Jung | ........... | H04N 25/709 348/300 |
| 11,765,481 B2 * | 9/2023 | Matsuura | ........... | H04N 25/75 348/302 |
| 11,770,641 B2 * | 9/2023 | Tatsuzawa | ........... | H04N 25/78 348/241 |
| 2014/0266309 A1 * | 9/2014 | Jakobson | ........... | H04N 25/75 327/63 |
| 2015/0237274 A1 * | 8/2015 | Yang | ........... | H04N 25/78 348/308 |
| 2017/0099423 A1 * | 4/2017 | Cremers | ........... | H04N 25/78 |
| 2019/0246057 A1 * | 8/2019 | Ebihara | ........... | H04N 25/616 |

(Continued)

*Primary Examiner* — Pritham D Prabhakher
(74) *Attorney, Agent, or Firm* — Perkins Coie LLP

(57) ABSTRACT

A pixel cell readout circuit comprises a comparator with a current mirror having first and second current paths, a first input transistor coupled to the first current path, a low conversion gain (LCG) second input transistor selectively coupled to the second current path, and a high conversion gain (HCG) second input transistor selectively coupled to the second current path. The pixel cell readout circuit further comprises a gain network coupled between a gate node of the first input transistor and a ramp generator output, wherein the gain network is configured to provide a variable comparator gain to the comparator, an LCG auto-zero switch coupled between a drain node and a gate node of the LCG second input transistor, and an HCG auto-zero switch coupled between a drain node and a gate node of the HCG second input transistor.

23 Claims, 7 Drawing Sheets

(56) References Cited

U.S. PATENT DOCUMENTS

| | | | |
|---|---|---|---|
| 2021/0250530 A1* | 8/2021 | Paik | H04N 25/778 |
| 2021/0274121 A1* | 9/2021 | Kim | H04N 25/78 |
| 2022/0078362 A1* | 3/2022 | Jung | H04N 25/75 |
| 2022/0174231 A1* | 6/2022 | Akebono | H03K 5/08 |
| 2022/0368849 A1* | 11/2022 | Hanzawa | H04N 25/42 |
| 2022/0394203 A1* | 12/2022 | Matsuura | H04N 25/709 |
| 2022/0417464 A1* | 12/2022 | Tatsuzawa | H04N 25/772 |

\* cited by examiner

DUAL GAIN COLUMN STRUCTURE FOR COLUMN POWER AREA EFFICIENCY

TECHNICAL FIELD

This disclosure relates generally to image sensors, and in particular but not exclusively, relates to high dynamic range (HDR) complementary metal oxide semiconductor (CMOS) image sensors.

BACKGROUND

Image sensors have become ubiquitous and are now widely used in digital cameras, cellular phones, security cameras, as well as in medical, automotive, and other applications. As image sensors are integrated into a broader range of electronic devices, it is desirable to enhance their functionality, performance metrics, and the like in as many ways as possible (e.g., resolution, power consumption, dynamic range) through both device architecture design as well as image acquisition processing. The technology used to manufacture image sensors has continued to advance at a great pace. For example, the demands of higher resolution and lower power consumption have encouraged the further miniaturization and integration of these devices.

A typical image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which is read out as analog image signals from the column bitlines and converted to digital values to produce digital images (e.g., image data) representing the external scene. The analog image signals on the bitlines are coupled to readout circuits, which include input stages having analog-to-digital (ADC) circuits to convert those analog image signals from the pixel array into the digital image signals.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
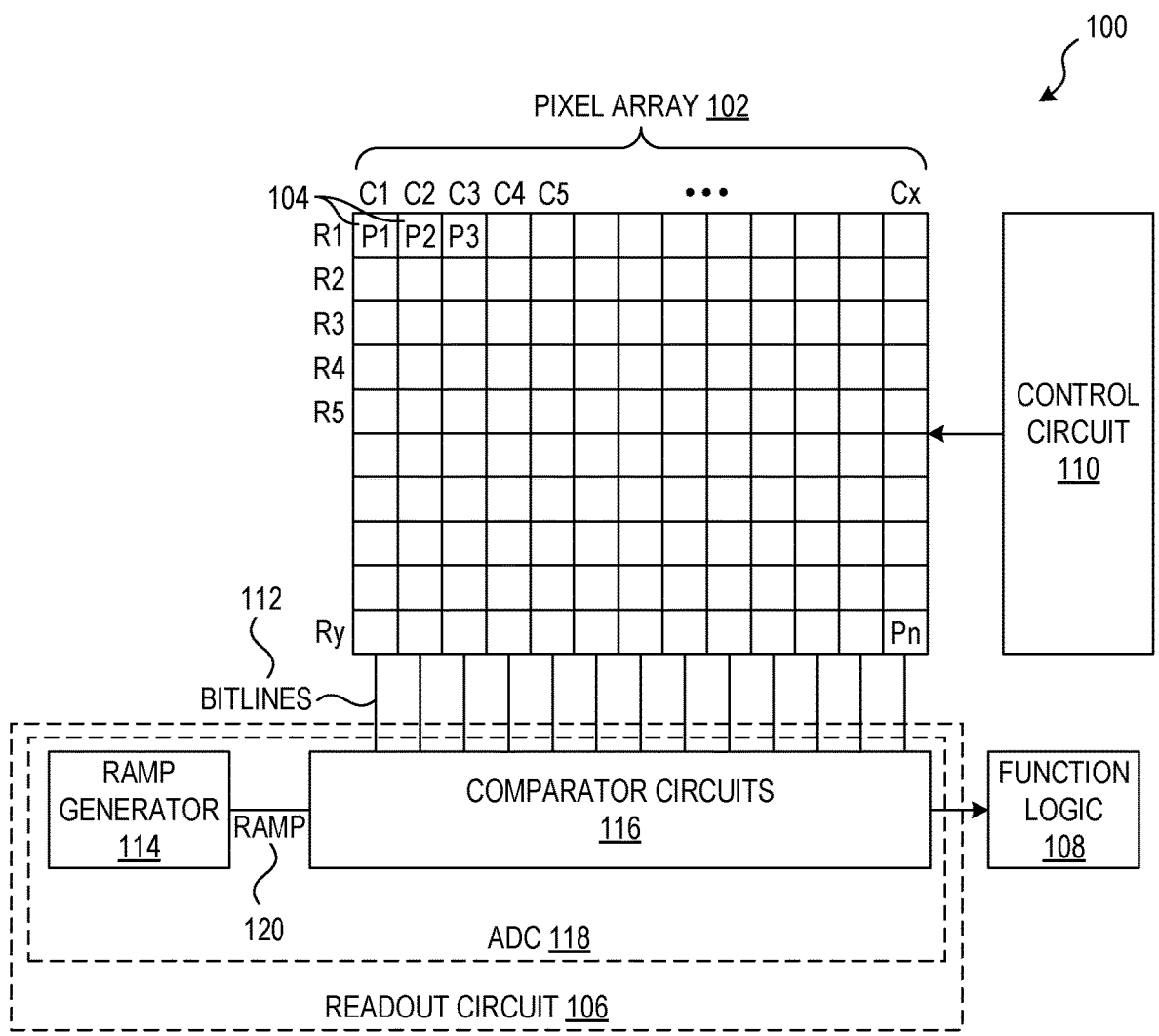
FIG. 1 illustrates one example of an imaging system including a pixel array in accordance with the teachings of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. In addition, common but well-understood elements that are useful or necessary in a commercially feasible embodiment are often not depicted in order to facilitate a less obstructed view of these various embodiments of the present disclosure.

DETAILED DESCRIPTION

Examples directed to an imaging system with a pixel cell readout circuit providing improved comparator range and reduced column area are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail in order to avoid obscuring certain aspects.

Reference throughout this specification to "one example" or "one embodiment" means that a particular feature, structure, or characteristic described in connection with the example is included in at least one example of the present disclosure. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "over," "under," "above," "upper," "top," "bottom," "left," "right," "center," "middle," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is rotated or turned over, elements described as "below" or "beneath" or "under" other elements or features would then be oriented "above" the other elements or features. Thus, the exemplary terms "below" and "under" can encompass both an orientation of above and below. The device may be otherwise oriented (rotated ninety degrees or at other orientations) and the spatially relative descriptors used herein interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

As will be discussed, various examples of an imaging system with a readout circuit providing improved comparator range and reduced column area are disclosed. In various examples, a comparator is configured to be auto-zeroed twice: a first instance prior to a low conversion gain (LCG) reset period, and a second instance prior to a high conversion gain (HCG) reset period. In various examples, a comparator is selectively coupled to an auto-zero voltage source.

Image sensors may implement dual conversion gain to obtain high dynamic range. The high dynamic range may be obtained by reading from pixels under low gain, then high gain, and then combining the two readouts. However, if the comparator is reset only once (e.g., prior to the readout period), there can be a significant auto-zero voltage difference between the LCG and HCG reset values. The auto-zero voltage difference is added to the HCG reset value, resulting in a reduction in comparator range and an increase in the need for post-processing (e.g., counter code).

In various examples of the present disclosure, the LCG/HCG auto-zero voltage difference is reduced by auto-zeroing the comparator twice. In various examples, the LCG/HCG auto-zero voltage difference is compensated for by adjusting an auto-zero voltage source that is selectively coupled to the comparator.

To illustrate, FIG. 1 shows one example of an imaging system 100 having a readout circuit 106 providing dual-analog-gain (DAG) in accordance with the teachings of the present disclosure. In particular, the example depicted in FIG. 1 illustrates an imaging system 100 that includes a pixel array 102, bitlines 112, a control circuit 110, a readout circuit 106, and function logic 108. In one example, pixel array 102 is a two-dimensional (2D) array including a plurality of pixel circuits 104 (e.g., P1, P2, . . . , Pn) that are arranged into rows (e.g., R1 to Ry) and columns (e.g., C1 to Cx) to acquire image data of a person, place, object, etc., which can then be used to render an image of a person, place, object, etc.

In various examples, the readout circuit 106 may be configured to read out the image signals through the column bitlines 112. As will be discussed, in the various examples, readout circuit 106 may include an analog-to-digital converter (ADC) with DAG in accordance with the teachings of the present disclosure. In various examples, the ADC includes a ramp generator 114 and comparator circuits 116. The ramp generator 114 has a ramp generator output from which a ramp signal 120 is provided to the comparator circuits 116. In the example, the digital image data values generated by the comparator circuits 116 may then be received by function logic 108. Function logic 108 may simply store the digital image data or even manipulate the digital image data by applying post image effects (e.g., crop, rotate, remove red eye, adjust brightness, adjust contrast, or otherwise).

In one example, control circuit 110 is coupled to pixel array 102 to control operation of the plurality of photodiodes in pixel array 102. For example, control circuit 110 may generate a rolling shutter or a shutter signal for controlling image acquisition. In other examples, image acquisition is synchronized with lighting effects such as a flash.

In one example, imaging system 100 may be included in a digital, cell phone, laptop computer, an endoscope, a security camera, or an imaging device for automobile, or the like. Additionally, imaging system 100 may be coupled to other pieces of hardware such as a processor (general purpose or otherwise), memory elements, output (USB port, wireless transmitter, HDMI port, etc.), lighting/flash, electrical input (keyboard, touch display, track pad, mouse, microphone, etc.), and/or display. Other pieces of hardware may deliver instructions to imaging system 100, extract image data from imaging system 100, or manipulate image data supplied by imaging system 100.

Figure 2:
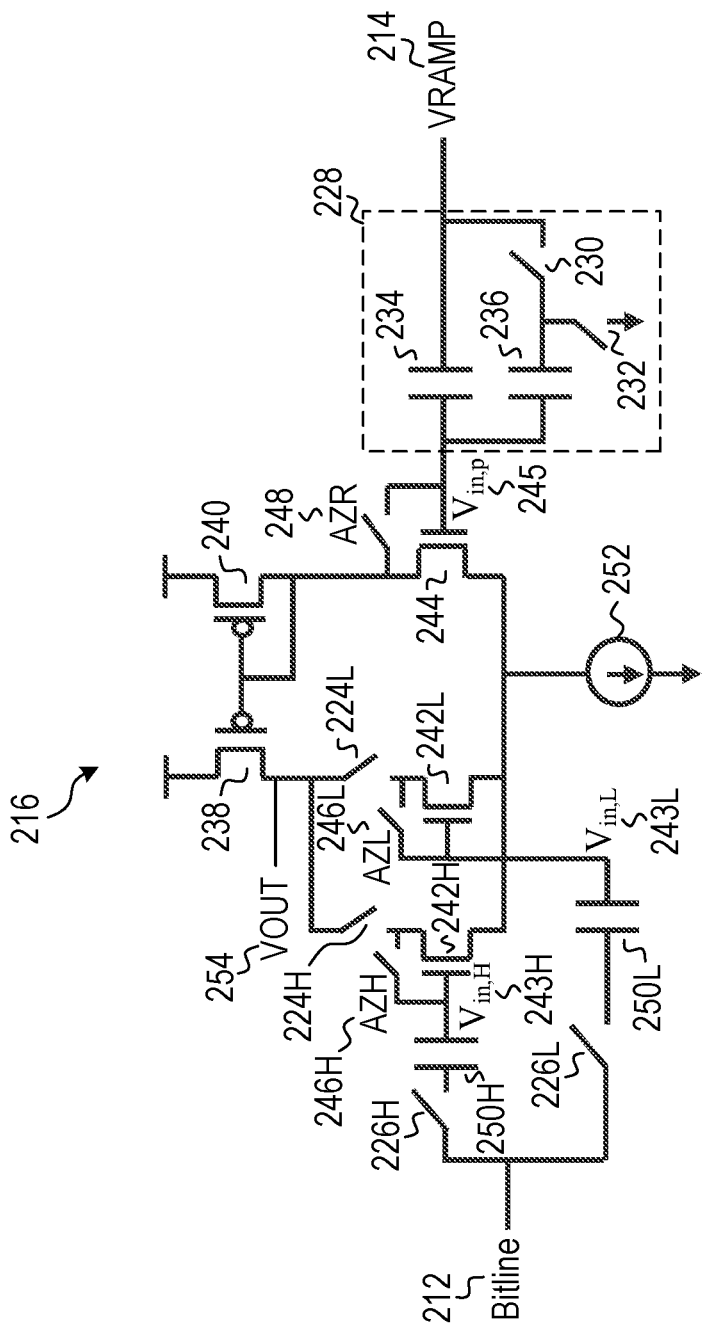
FIG. 2 illustrates a schematic of one example of a readout circuit including a comparator in accordance with the teachings of the present disclosure.

FIG. 2 illustrates a schematic of one example of a readout circuit 206 in accordance with the teachings of the present disclosure. It is appreciated that the readout circuit 206 of FIG. 2 may be an example of the readout circuit 106 included in the imaging system 100 as shown in FIG. 1, and that similarly named and numbered elements described above are coupled and function similarly below.

The readout circuit 206 includes a comparator 216 with a first input coupled to a ramp gain network 228 and two alternative second inputs each selectively coupled to a bitline 212. In the depicted example, it is appreciated that the first input of the comparator 216 is the gate of transistor 244 and the two alternative second inputs of the comparator 216 are the gates of transistor 242L and 242H. In various examples, transistor 242L is used for low conversion gain (LCG) readout, and transistor 242H is used for high conversion gain (HCG) readout. As shown, the comparator 216 includes transistor 240, on a first current path, and transistor 238, on a second current path, coupled as a current mirror. The first input transistor 244 is coupled to transistor 240, and the two second input transistors 242L and 242H are each selectively coupled to transistor 238 via switches 224L and 224H, respectively. A tail current source 252 is coupled to transistors 242L, 242H, and 244 as shown.

The ramp gain network 228 is configured to provide a variable comparator gain by controlling the slope of a ramp signal generated by a ramp generator output VRAMP 214 in accordance with the teachings of the present disclosure. The variable comparator gain becomes higher as the slope of the ramp signal becomes lower. In the illustrated example, the ramp gain network 228 includes a first gain capacitor 234 and a second gain capacitor 236. The first gain capacitor 234 may be coupled between the first input of the comparator 216 and the ramp generator output VRAMP 214. The second gain capacitor 236 may be selectively coupled between the first input of the comparator 216 and either the ramp generator output VRAMP 214 via switch 230 or ground via switch 232. Only one of switches 230 and 232 is on at a time, allowing the first and second gain capacitors 234 and 236 to act as a voltage divider when needed to reduce the slope of the ramp signal. In various examples, it is appreciated that other examples of the ramp gain network 228 may have different components and/or configurations that provide variable comparator gain in accordance with the teachings of the present disclosure. For example, the number of gain capacitors in ramp gain network 228 may depend on the number of desired comparator gain settings. For instance, in various examples, ramp gain network 228 may each include one first gain capacitor 234 and one or more second gain capacitors 236 with one or more corresponding sets of switches 230 and 232 that selectively couple the respective second gain capacitor 236 between the first input of the comparator 216 and either the ramp generator output VRAMP 214 via switch 230 or ground via switch 232 as shown in the example depicted in FIG. 2.

In the illustrated example, an LCG capacitor 250L is selectively coupled between the bitline 212 (via switch 226L) and the gate of transistor 242L, and an HCG capacitor 250H is selectively coupled between the bitline 212 (via switch 226H) and the gate of transistor 242H. The LCG capacitor 250L is further selectively coupled to a drain node of transistor 242L via an LCG auto-zero switch AZL 246L, and the HCG capacitor 250H is further selectively coupled to a drain node of transistor 242H via an HCG auto-zero switch AZH 246H. Furthermore, the ramp gain network 228 is selectively coupled to a drain node of transistor 244 via a ramp auto-zero switch AZR 248.

The comparator 216 has an output voltage VOUT 254 from the node between the drain of transistor 238 and the drains of transistors 242L and 242H. The node between the first input of the comparator 216 and the ramp gain network 228 has a voltage $V_{in,p}$ 245. The node between the LCG capacitor 250L and the gate of transistor 242L has a voltage $V_{in,L}$ 243L. The node between the HCG capacitor 250H and the gate of transistor 242H has a voltage $V_{in,H}$ 243H.

Figure 3A:
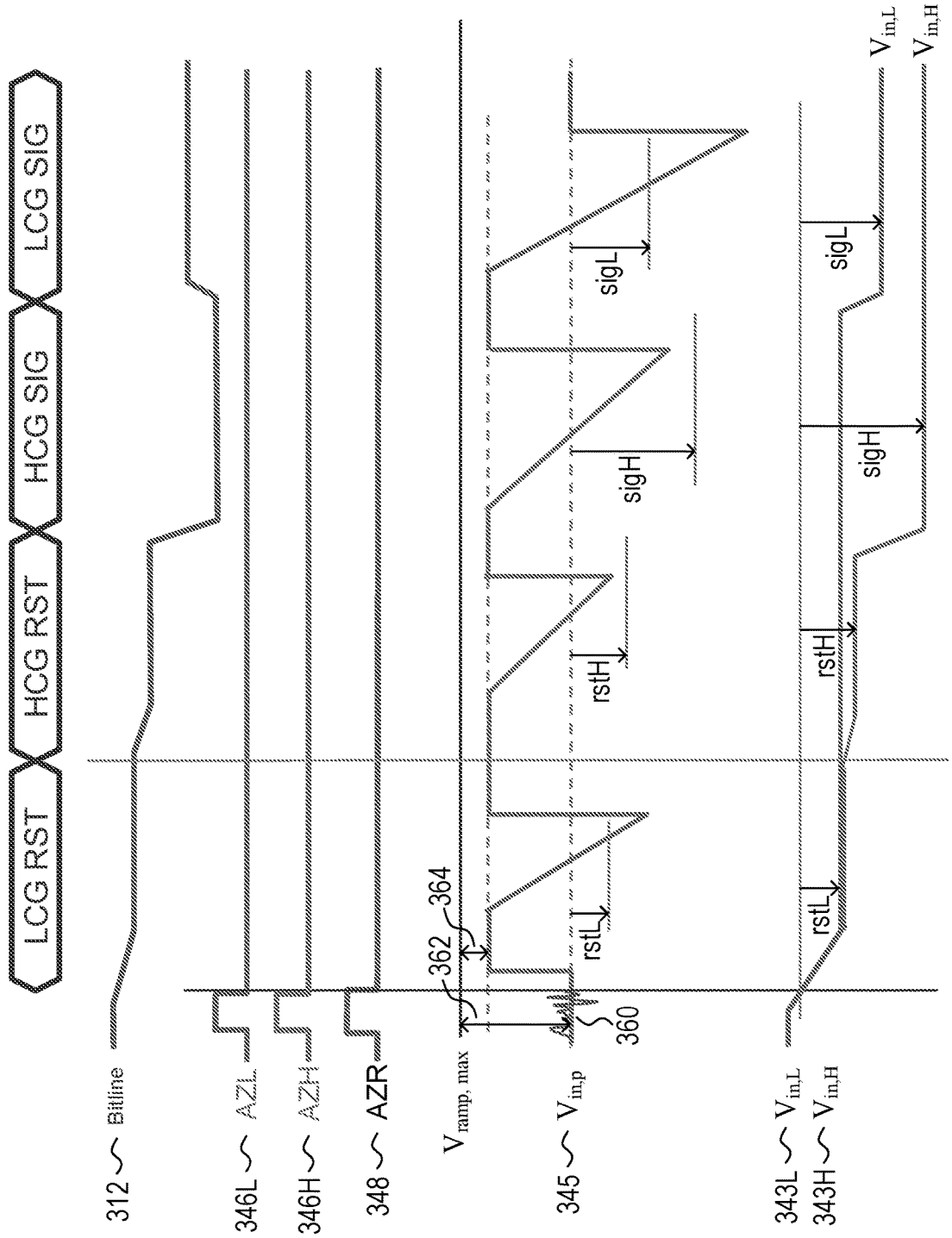
FIGS. 3A and 3B illustrate readout period timing diagrams of a comparator in an example readout circuit with one auto-zero period with insufficient HCG reset value and HCG signal value ramp times and with sufficient HCG reset value and HCG signal value ramp times in accordance with the teachings of the present disclosure.
Figure 3B:
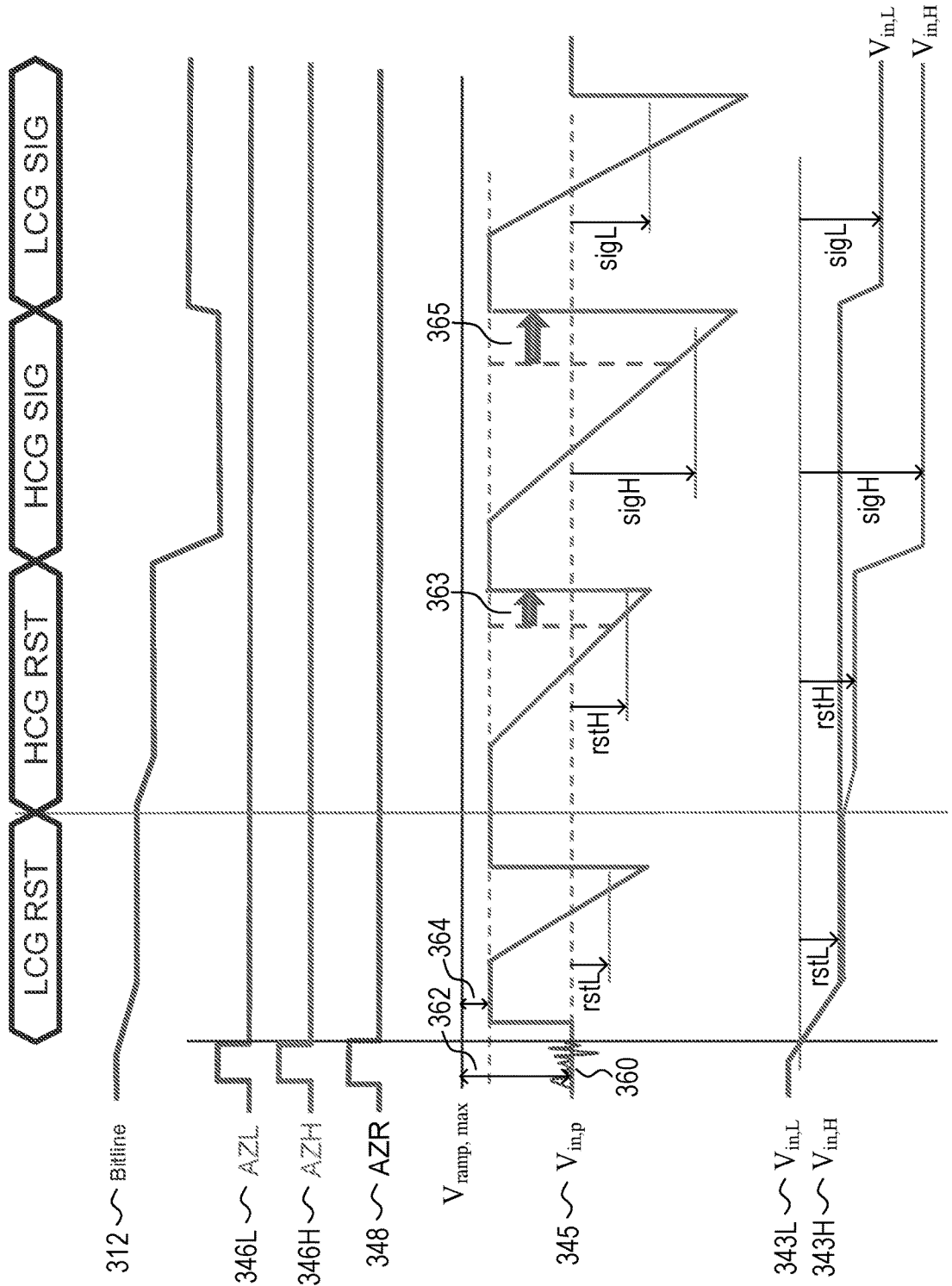

FIGS. 3A and 3B illustrate readout period timing diagrams of a comparator in an example readout circuit with one auto-zero period with insufficient HCG reset value and HCG signal value ramp times and with sufficient HCG reset value and HCG signal value ramp times in accordance with the teachings of the present disclosure. In the illustrated example, the readout period includes an LCG reset period, an HCG reset period, an HCG signal readout period, and an LCG signal readout period. It is appreciated that FIGS. 3A-3B may illustrate example readout period timing diagrams of the comparator 216 illustrated in FIG. 2, and that similarly named and numbered elements described above are coupled and function similarly below.

Referring to both FIGS. 3A and 3B, prior to the LCG reset period, an LCG auto-zero switch AZL 346L, an HCG auto-zero switch AZH 346H, and a ramp auto-zero switch AZR 348 are each pulsed to auto-zero the comparator. As shown in the depicted example, the switches 346L, 346H, and 348 are each pulsed simultaneously only once during the readout period of a given frame such that the comparator has only one auto-zero period. The node between a first input of the comparator and a ramp gain network has a voltage $V_{in,p}$ 345. The value of $V_{in,p}$ 345 responds to a comparator voltage digital number (CVDN) offset relative to the maximum voltage value of the ramp generator output. The CVDN is the register setting to adjust the offset from the ramp generator output voltage. The CVDN offset prior to the LCG reset period is represented by CVDN offset 362. In various examples, $V_{in,p}$ 345 is not always a constant value due to kT/C noise 360. Therefore, the CVDN offset may represent an average offset value.

The node between an LCG capacitor and the gate of an LCG second input transistor has a voltage $V_{in,L}$ 343L. The node between an HCG capacitor and the gate of an HCG second input transistor has a voltage $V_{in,H}$ 343H. Prior to the LCG reset period, $V_{in,L}$ 343L may be equal or substantially similar to $V_{in,H}$ 343H.

During the LCG reset period, $V_{in,p}$ 345 initially changes value in response to CVDN offset 364, then decreases with a downward slope. The angle of the slope is determined by the variable comparator gain provided by a ramp gain network. In the illustrated example, $V_{in,p}$ 345 intersects the LCG reset value ("rstL"), which derives from the bitline voltage value 312. Both $V_{in,L}$ 343L and $V_{in,H}$ 343H fall to the rstL value. $V_{in,p}$ 345 then increases to the same value as before in response to CVDN offset 364 because the comparator is not auto-zeroed again.

During the HCG reset period, $V_{in,p}$ 345 decreases again with a downward slope, but the angle of the slope is different from the LCG reset period (e.g., less steep and representing a higher comparator gain). However, there is a difference between the rstL value and HCG reset value ("rstH"), as shown in the bitline voltage value 312. Both reset values rstL and rstH are measured from CVDN offset 362, the rstH value is greater than the rstL value, and the HCG ramp is less steep. FIG. 3A illustrates an example in which the rstH ramp time is insufficient. Consequently, as illustrated in FIG. 3A, $V_{in,p}$ 345 fails to intersect rstH, causing errors in ADC output digital code. $V_{in,L}$ 343L and $V_{in,H}$ 343H diverge as $V_{in,L}$ 343L remains at the rstL value while $V_{in,H}$ 343H falls to the rstH value. $V_{in,p}$ 345 then increases to the same value as before in response to CVDN offset 364.

As illustrated in FIG. 3B, one method of ensuring that $V_{in,p}$ 345 intersects rstH is to increase or extend the rstH ramp time by an additional rstH ramp period 363. However, this method increases both the counter code needed and the row period. Given the maximum ramp voltage swing, the method also consumes ADC range for the HCG reset.

During the HCG signal readout period, $V_{in,p}$ 345 decreases again with the same downward slope as in the HCG reset period. FIG. 3A also illustrates an example in which the sigH ramp time is insufficient. Consequently, as illustrated in FIG. 3A, $V_{in,p}$ 345 also fails to intersect the HCG signal value ("sigH"), again causing errors in ADC output digital code. As shown, the sigH value is measured from CVDN offset 362. $V_{in,L}$ 343L remains at the rstL value while $V_{in,H}$ 343H falls to the sigH value. $V_{in,p}$ 345 then increases to the same value as before in response to CVDN offset 364.

As illustrated in FIG. 3B, one method of ensuring that $V_{in,p}$ 345 intersects sigH is to also increase or extend the sigH ramp time by an additional sigH ramp period 365. However, this method increases both the counter code needed and the row period. Given the maximum ramp voltage swing, the method also consumes ADC range for the HCG signal.

During the LCG signal readout period, $V_{in,p}$ 345 decreases again with the same downward slope as in the LCG reset period. In the illustrated example, $V_{in,p}$ 345 intersects the LCG signal value ("sigL"), indicating that comparator range reduction is more significant for HCG readout than LCG readout. $V_{in,L}$ 343L falls to the sigL value while $V_{in,H}$ 343H remains at the sigH value. $V_{in,p}$ 345 then returns to the value prior to the readout period in response to CVDN offset 362. After the LCG signal readout period, the comparator moves on to readout values corresponding to the next frame, repeating the timing diagram illustrated and described above.

Figure 4:
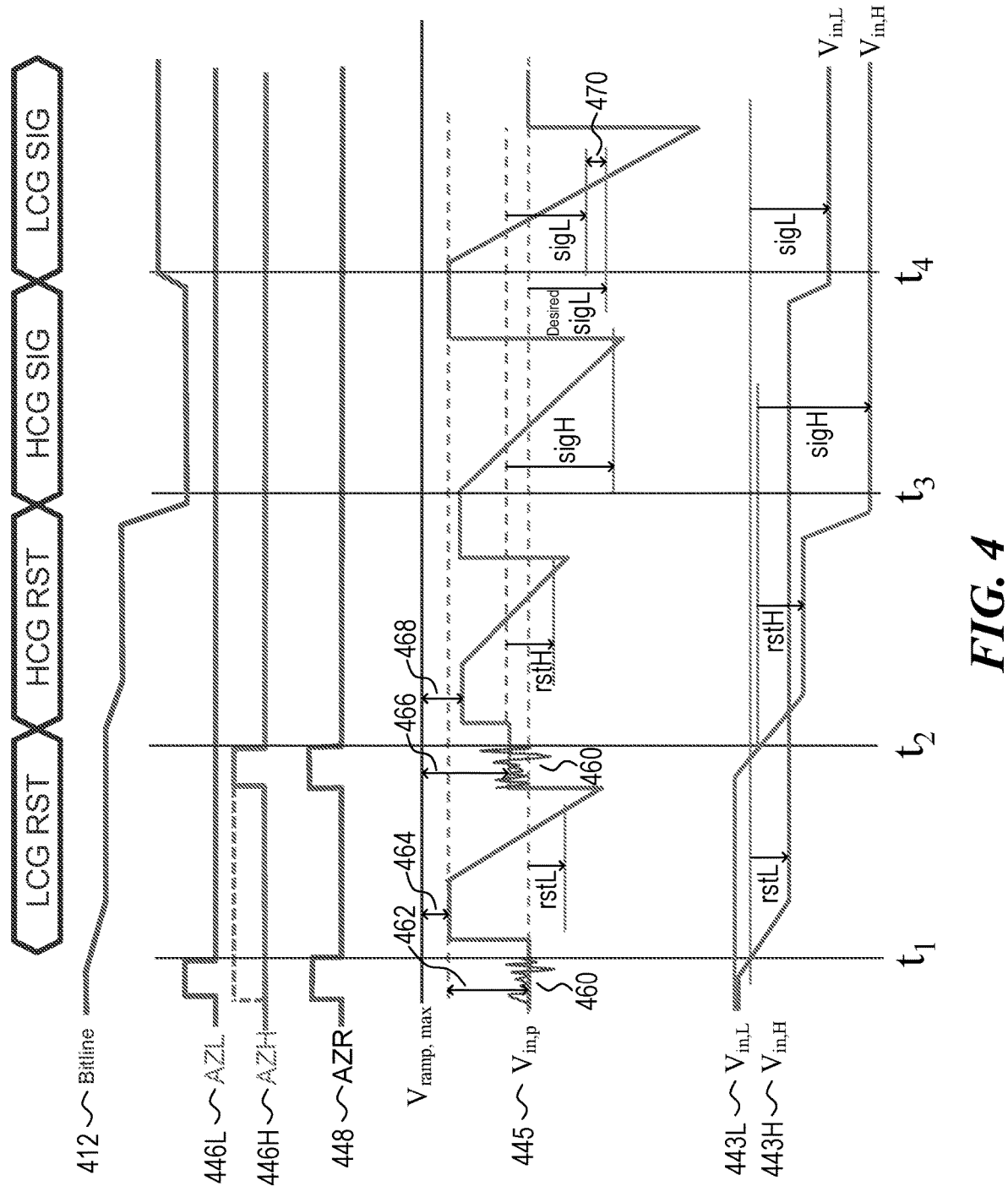
FIG. 4 illustrates a readout period timing diagram of a comparator in an example readout circuit with two auto-zero periods in accordance with the teachings of the present disclosure.

FIG. 4 illustrates a readout period timing diagram of a comparator in an example readout circuit with two auto-zero periods in accordance with the teachings of the present disclosure. In the illustrated example, the readout period includes an LCG reset period, an HCG reset period, an HCG signal readout period, and an LCG signal readout period. It is appreciated that FIG. 4 may be an example readout period timing diagram of the comparator 216 illustrated in FIG. 2, and that similarly named and numbered elements described above are coupled and function similarly below.

As shown in the depicted example, prior to the LCG reset period, an LCG auto-zero switch AZL 446L and a ramp auto-zero switch AZR 448 are each pulsed simultaneously to auto-zero the comparator a first time. In various examples, an HCG auto-zero switch AZH 446H is not pulsed, but remains off until the end of the LCG reset period. In various examples, the HCG auto-zero switch AZH 446H is turned on simultaneously along with AZL 446L and AZR 448, and remains on until the end of the LCG reset period. The node between a first input of the comparator and a ramp gain network has a voltage $V_{in,p}$ 445. The CVDN offset prior to the LCG reset period is represented by CVDN offset 462. In various examples, $V_{in,p}$ 445 is not always a constant value due to kT/C noise 460. Therefore, the CVDN offset may represent an average offset value.

The node between an LCG capacitor and the gate of an LCG second input transistor has a voltage $V_{in,L}$ 443L. The node between an HCG capacitor and the gate of an HCG second input transistor has a voltage $V_{in,H}$ 443H. Prior to the LCG reset period, $V_{in,L}$ 443L may be equal or substantially similar to $V_{in,H}$ 443H.

During the LCG reset period, between times $t_1$ and $t_2$, $V_{in,p}$ 445 initially changes value in response to CVDN offset 464, then decreases with a downward slope. The angle of the slope is determined by the variable comparator gain provided by a ramp gain network. In the illustrated example, $V_{in,p}$ 445 intersects the rstL value, which derives from the bitline voltage value 412. AZR 448 is then pulsed again to auto-zero the comparator a second time. In various examples, AZH 446H is pulsed simultaneously with AZR 448. In various examples, AZH 446H was turned on simultaneously when AZL 446L and AZR 448 were pulsed prior to the LCG reset period, and is turned off with AZR 448 at the end of the LCG reset period. In the examples in which AZH 446H is pulsed, $V_{in,L}$ 443L falls to the rstL value while $V_{in,H}$ 443H remains at the initial value until AZH 446H is pulsed. $V_{in,p}$ 445 then increases in response to CVDN offset 466 because the comparator is auto-zeroed a second time.

In various examples, CVDN offset 466 is equal or substantially similar to CVDN offset 462. This enables a reduction in the LCG signal offset from the auto-zero voltage difference, which has advantages described further below. In various examples, $V_{in,p}$ 445 again exhibits behavior in response to kT/C noise 460 after the second auto-zero period, resulting in increased noise and thus a drop in signal-to-noise ratio (SNR) at knee point.

During the HCG reset period, between times $t_2$ and $t_3$, $V_{in,p}$ 445 increases again to a CVDN offset 468, then decreases with a downward slope, but the angle of the slope is different from the LCG reset period (e.g., less steep and representing a higher comparator gain). While the magnitude of the rstH value is greater than the magnitude of the rstL value, as seen in the bitline voltage value 412, rstH is measured from the second auto-zeroed $V_{in,p}$ 445 value (i.e., CVDN offset 466) instead of the first auto-zeroed $V_{in,p}$ 445 value (i.e., CVDN offset 462). As a result, $V_{in,p}$ 445 intersects the rstH value, avoiding the reduced comparator range issue depicted in FIG. 3A. $V_{in,L}$ 443L remains at the rstL value while $V_{in,H}$ 443H falls to the rstH value as measured from a different reference voltage value, as shown in FIG. 4. $V_{in,p}$ 445 then returns to CVDN offset 468.

During the HCG signal readout period, between times $t_3$ and $t_4$, $V_{in,p}$ 445 decreases again with the same downward slope as in the HCG reset period. $V_{in,p}$ 445 intersects the sigH value, again avoiding the reduced comparator range issue depicted in FIG. 3A. As shown, the sigH value is measured from CVDN offset 466. $V_{in,L}$ 443L remains at the rstL value while $V_{in,H}$ 443H falls to the sigH value as measured from the same reference voltage value as rstH is measured from. $V_{in,p}$ 445 then increases back to the same high value during the LCG reset period in response to CVDN offset 464.

During the LCG signal readout period, from time $t_4$, $V_{in,p}$ 445 decreases again with the same downward slope as in the LCG reset period. In the illustrated example, $V_{in,p}$ 445 intersects the the sigL value, which is measured from CVDN offset 466. While this sigL value represents the actual LCG flipping point, the desired LCG flipping point is the sigL value measured from CVDN offset 462, as shown in FIG. 4. The difference between the actual and desired sigL is the LCG extra noise 470. Therefore, the advantages of auto-zeroing the comparator twice, namely improved comparator range and reduced column area, should be balanced against the LCG extra noise. $V_{in,L}$ 443L falls to the sigL value as measured from the same reference voltage value as rstL is measured from, while $V_{in,H}$ 443H remains at the sigH value. After the LCG signal readout period, the comparator moves on to readout values corresponding to the next frame, repeating the timing diagram illustrated and described above.

Figure 5:
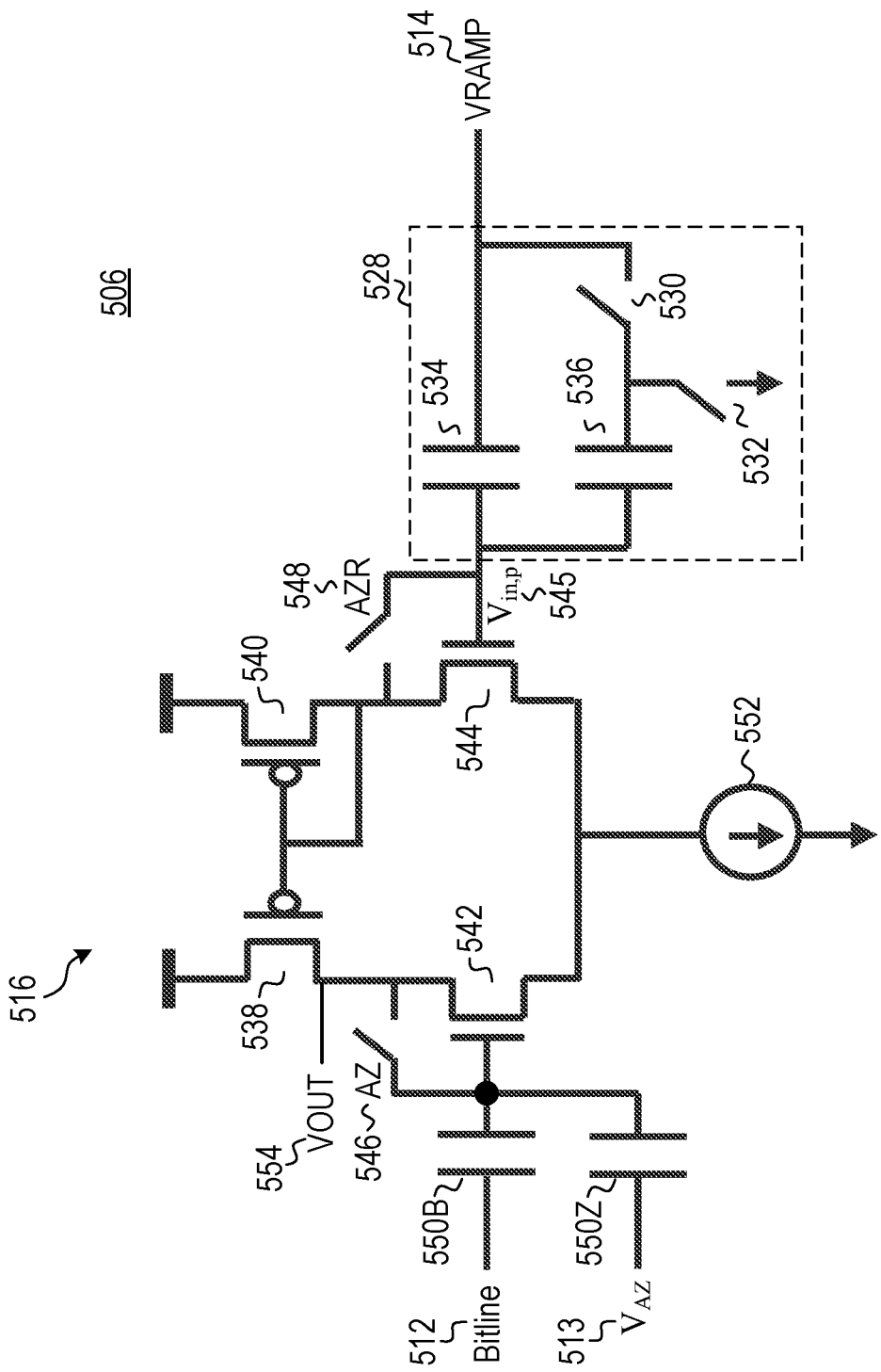
FIG. 5 illustrates a schematic of one example of a readout circuit including a comparator in accordance with the teachings of the present disclosure.

FIG. 5 illustrates a schematic of one example of a readout circuit 506 in accordance with the teachings of the present disclosure. It is appreciated that the readout circuit 506 of FIG. 5 may be an example of the readout circuit 106 included in the imaging system 100 as shown in FIG. 1, and that similarly named and numbered elements described above are coupled and function similarly below.

The readout circuit 506 includes a comparator 516 with a first input coupled to a ramp gain network 528 and a second input coupled to a bitline 512. In the depicted example, it is appreciated that the first input of the comparator 516 is the gate of transistor 544 and the second input of the comparator 516 is the gate of transistor 542. As shown, the comparator 516 includes transistor 540, on a first current path, and transistor 538, on a second current path, coupled as a current mirror. The first input transistor 544 is coupled to transistor 540, and the second input transistor 542 is coupled to transistor 538. A tail current source 552 is coupled to transistors 542 and 544 as shown.

The ramp gain network 528 is configured to provide a variable comparator gain by controlling the slope of a ramp signal generated by a ramp generator output VRAMP 514 in accordance with the teachings of the present disclosure. The variable comparator gain becomes higher as the slope of the ramp signal becomes lower. In the illustrated example, the ramp gain network 528 includes a first gain capacitor 534 and a second gain capacitor 536. The first gain capacitor 534 may be coupled between the first input of the comparator 516 and the ramp generator output VRAMP 514. The second gain capacitor 536 may be selectively coupled between the first input of the comparator 516 and either the ramp generator output VRAMP 514 via switch 530 or ground via switch 532. Only one of switches 530 and 532 is on at a time, allowing the first and second gain capacitors 534 and 536 to act as a voltage divider when needed to reduce the slope of the ramp signal. In various examples, it is appreciated that other examples of the ramp gain network 528 may have different components and/or configurations that provide variable comparator gain in accordance with the teachings of the present disclosure. For example, the number of gain capacitors in ramp gain network 528 may depend on the number of desired comparator gain settings. For instance, in various examples, ramp gain network 528 may each include one first gain capacitor 534 and one or more second gain capacitors 536 with one or more corresponding sets of switches 530 and 532 that selectively couple the respective second gain capacitor 536 between the first input of the comparator 516 and either the ramp generator output VRAMP 514 via switch 530 or ground via switch 532 as shown in the example depicted in FIG. 5.

In the illustrated example, a bitline capacitor 550B is coupled between the bitline 512 and the gate of transistor 542. The comparator 516 has an output voltage VOUT 554 from the node between the drain of transistor 538 and the drain of transistor 542. The node between the drain of transistor 538 and the drain of transistor 542 is further selectively coupled to an auto-zero voltage source $V_{AZ}$ 513 and the gate of transistor 542 via auto-zero switch AZ 546. An auto-zero capacitor 550Z is coupled between the auto-zero voltage source $V_{AZ}$ 513 and the auto-zero switch AZ 546. The auto-zero capacitor 550Z is further coupled between the auto-zero voltage source $V_{AZ}$ 513 and the gate of transistor 542. The node between the first input of the comparator 516 and the ramp gain network 528 has a voltage $V_{in\_p}$ 545. The ramp gain network 528 is further selectively coupled to a drain of transistor 544 via a ramp auto-zero switch AZR 548.

In various examples, the bitline capacitor 550B and the auto-zero capacitor 550Z have the same capacitance. In various examples, the bitline capacitor 550B has a different capacitance than the auto-zero capacitor 550Z (e.g., the bitline capacitor 550B has a capacitance six, eight, or ten times greater than the capacitance of the auto-zero capacitor 550Z). In various examples, the auto-zero voltage source $V_{AZ}$ 513 has a voltage value between 0.8 V and 1.6 V.

Figure 6:
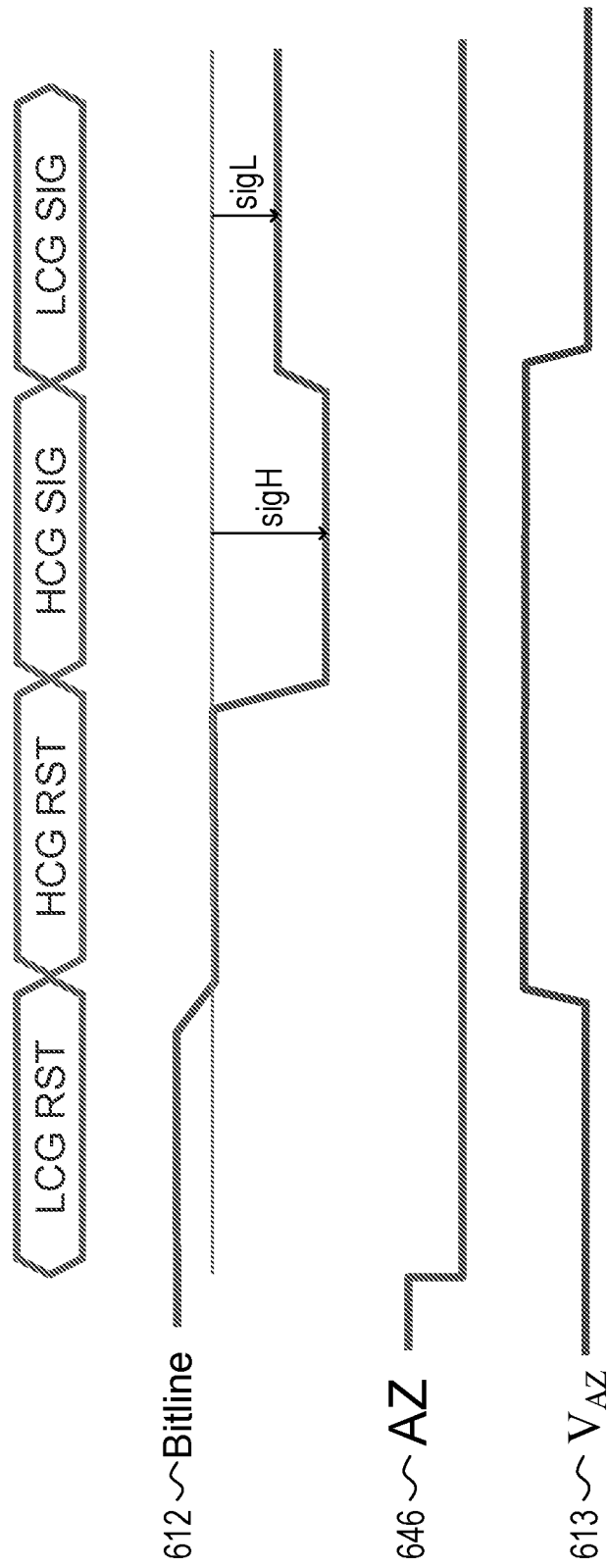
FIG. 6 illustrates a readout period timing diagram of a comparator in an example readout circuit with an auto-zero voltage source in accordance with the teachings of the present disclosure.

FIG. 6 illustrates a readout period timing diagram of a comparator in an example readout circuit with an auto-zero voltage source in accordance with the teachings of the present disclosure. In the illustrated example, the readout period includes an LCG reset period, an HCG reset period, an HCG signal readout period, and an LCG signal readout period. It is appreciated that FIG. 6 may be an example readout period timing diagram of the comparator 516 illustrated in FIG. 5, and that similarly named and numbered elements described above are coupled and function similarly below.

Prior to the LCG reset period, the auto-zero switch AZ 646 is pulsed to auto-zero the comparator. During the LCG reset period, the auto-zero voltage source $V_{AZ}$ 613 is configured to remain at a low value. As the readout circuit moves onto the HCG reset period, the auto-zero voltage source $V_{AZ}$ 613 is configured to change to a high value and remain at the high value during both the HCG reset period and the HCG signal readout period. As the readout circuit moves onto the LCG reset period, the auto-zero voltage source $V_{AZ}$ 613 is configured to change back to a low value.

The auto-zero voltage source $V_{AZ}$ 613 is configured to be adjusted to compensate for the difference between the LCG and HCG reset levels, as shown in the bitline voltage value 612. In various examples, the difference between the LCG and HCG reset levels ranges between 100 mV and 200 mV. In various examples, the auto-zero voltage source $V_{AZ}$ 613 is configured to be auto-calibrated based on the frame and the analog gain.

However, the advantages of adjusting the auto-zero voltage source $V_{AZ}$ 613 to compensate for the difference between the LCG and HCG reset levels should be balanced against the random noise generated by the auto-zero voltage source $V_{AZ}$ 613. The capacitor coupled between the auto-zero voltage source $V_{AZ}$ 613 and the comparator (e.g., auto-zero capacitor 550Z in FIG. 5) is an additional source of column gain error. Buffer noise from the auto-zero voltage source $V_{AZ}$ 613 is proportionally added to the readout signal through the coupled capacitor (e.g., auto-zero capacitor 550Z in FIG. 5) row-by-row. Furthermore, there may be random noise from the capacitor voltage divider configuration. In various examples, the effective signal gain is less than 1. There may also be H-banding from the settling of the auto-zero voltage source $V_{AZ}$ 613. In various examples, it is appreciated that global or local buffers may be coupled to the auto-zero voltage source $V_{AZ}$ 613 to provide extra power and decrease the settling time.

The above description of illustrated examples of the disclosure, including what is described in the Abstract, is not intended to be exhaustive or to limit the disclosure to the precise forms disclosed. While specific examples of the disclosure are described herein for illustrative purposes, various modifications are possible within the scope of the disclosure, as those skilled in the relevant art will recognize.

These modifications can be made to the disclosure in light of the above detailed description. The terms used in the following claims should not be construed to limit the disclosure to the specific examples disclosed in the specification. Rather, the scope of the disclosure is to be determined entirely by the following claims, which are to be construed in accordance with established doctrines of claim interpretation.

What is claimed is:

1. A pixel cell readout circuit, comprising:
    a comparator, comprising:
        a current mirror having a first current path and a second current path;
        a first input transistor coupled to the first current path of the current mirror;
        a low conversion gain (LCG) second input transistor selectively coupled to the second current path of the current mirror; and
        a high conversion gain (HCG) second input transistor selectively coupled to the second current path of the current mirror; and
    a gain network coupled between a gate node of the first input transistor and a ramp generator output, wherein the gain network is configured to provide a variable comparator gain to the comparator;
    an LCG auto-zero switch coupled between a drain node and a gate node of the LCG second input transistor; and
    an HCG auto-zero switch coupled between a drain node and a gate node of the HCG second input transistor,
    wherein the gate node of the LCG second input transistor and the gate node of the HCG second input transistor are each selectively coupled to a bitline,
    wherein the LCG auto-zero switch is configured to be turned on and off prior to an LCG reset period, and
    wherein the HCG auto-zero switch is configured to be turned on and off prior to an HCG reset period.

2. The pixel cell readout circuit of claim 1, further comprising a ramp auto-zero switch coupled between a drain node and the gate node of the first input transistor, wherein the ramp auto-zero switch is configured to be turned on and off prior to the LCG reset period, and wherein the ramp auto-zero switch is further configured to be turned on and off prior to the HCG reset period.

3. The pixel cell readout circuit of claim 1, further comprising:
    an LCG capacitor selectively coupled between the gate node of the LCG second input transistor and the bitline; and
    an HCG capacitor selectively coupled between the gate node of the HCG second input transistor and the bitline.

4. The pixel cell readout circuit of claim 1, further comprising a tail current source coupled between a reference voltage and source nodes of the first input transistor, the LCG second input transistor, and the HCG second input transistor.

5. The pixel cell readout circuit of claim 1, wherein a voltage value at the gate node of the first input transistor is configured to be less than a maximum voltage value of the ramp generator output in response to a comparator voltage digital number (CVDN) offset.

6. The pixel cell readout circuit of claim 5, wherein the CVDN offset during the LCG reset period is configured to be less than the CVDN offset during the HCG reset period.

7. The pixel cell readout circuit of claim 5, wherein the CVDN offset while the LCG auto-zero switch is on is configured to be greater than the CVDN offset while the HCG auto-zero switch is on.

8. The pixel cell readout circuit of claim 5, wherein the CVDN offset while the LCG auto-zero switch is on is configured to be substantially similar to the CVDN offset while the HCG auto-zero switch is on.

9. A method of operating a pixel cell readout circuit, comprising:
    selectively coupling each of a low conversion gain (LCG) second input transistor and a high conversion gain (HCG) second input transistor of a comparator to a current mirror of the comparator;
    coupling a gain network between a gate node of a first input transistor of the comparator and a ramp generator output, wherein the gain network is configured to provide a variable comparator gain to the comparator;
    coupling an LCG auto-zero switch between a drain node and a gate node of the LCG second input transistor, wherein the gate node of the LCG second input transistor is further selectively coupled to a bitline;
    coupling an HCG auto-zero switch between a drain node and a gate node of the HCG second input transistor, wherein the gate node of the HCG second input transistor is further selectively coupled to the bitline;
    prior to an LCG reset period,
    turning on and off the LCG auto-zero switch; and
    prior to an HCG reset period,
    turning on and off the HCG auto-zero switch.

10. The method of claim 9, further comprising:
    coupling a ramp auto-zero switch between a drain node and the gate node of the first input transistor; prior to the LCG reset period,
    turning on and off the ramp auto-zero switch; and
    prior to the HCG reset period,
    turning on and off the ramp auto-zero switch.

11. The method of claim 9,
    wherein the gate node of the LCG second input transistor is further selectively capacitively coupled to the bitline through an LCG capacitor, and
    wherein the gate node of the HCG second input transistor is further selectively capacitively coupled to the bitline through an HCG capacitor.

12. The method of claim 9, wherein a voltage value at the gate node of the first input transistor is configured to be less than maximum voltage value of the ramp generator output in response to a comparator voltage digital number (CVDN) offset.

13. The method of claim 12, wherein the CVDN offset during the LCG reset period is configured to be less than the CVDN offset during the HCG reset period.

14. The method of claim 12, wherein the CVDN offset while the LCG auto-zero switch is on is configured to be greater than a CVDN offset while the HCG auto-zero switch is on.

15. The method of claim 12, wherein the CVDN offset while the LCG auto-zero switch is on is configured to be substantially similar to a CVDN offset while the HCG auto-zero switch is on.

16. A pixel cell readout circuit, comprising:
    a comparator having a first input transistor and a second input transistor;
    a gain network coupled between a gate node of the first input transistor and a ramp generator output, wherein the gain network is configured to provide a variable comparator gain to the comparator;
    a first capacitor coupled between a gate node of the second input transistor and a bitline; and
    a second capacitor coupled between the gate node of the second input transistor and an auto-zero voltage source, wherein the auto-zero voltage source is configured to be at a low level during a low conversion gain (LCG) reset period and an LCG signal readout period, and
    wherein the auto-zero voltage source is configured to be at a high level during a high conversion gain (HCG) reset period and an HCG signal readout period.

17. The pixel cell readout circuit of claim 16, further comprising a first auto-zero switch coupled between a drain node and the gate node of the first input transistor.

18. The pixel cell readout circuit of claim 16, further comprising a second auto-zero switch coupled between the drain node and the gate node of the second input transistor, wherein the second auto-zero switch is configured to be on and turned off prior to the LCG reset period, wherein the second auto-zero switch is configured to remain off during the HCG reset period, the HCG signal readout period, and the LCG signal readout period.

19. The pixel cell readout circuit of claim 16, wherein a capacitance of the first capacitor is between six and ten times a capacitance of the second capacitor.

20. A method of operating a pixel cell readout circuit, comprising:
    coupling a gain network between a gate node of a first input transistor of a comparator and a ramp generator output, wherein the gain network is configured to provide a variable comparator gain to the comparator;
    coupling a first capacitor between a gate node of a second input transistor of the comparator and a bitline;
    coupling a second capacitor between the gate node of the second input transistor and an auto-zero voltage source;
    during a low conversion gain (LCG) reset period,
    configuring the auto-zero voltage source to be at a low level;
    during a high conversion gain (HCG) reset period,
    configuring the auto-zero voltage source to be at a high level;
    during an HCG signal readout period,
    configuring the auto-zero voltage source to be at the high level; and
    during an LCG signal readout period,
    configuring the auto-zero voltage source at the low level.

21. The method of claim 20, further comprising coupling a first auto-zero switch between a drain node and the source node of the first input transistor.

22. The method of claim 20, further comprising:
    coupling a second auto-zero switch between a drain node and the gate node of the second input transistor;
    prior to the LCG reset period,
    turning on and off the second auto-zero switch;
    during the LCG reset period, the HCG reset period, the HCG signal readout period, and the LCG signal readout period,
    keeping the second auto-zero switch off.

23. The method of claim 20, wherein a capacitance of the first capacitor is between six and ten times a capacitance of the second capacitor.

* * * * *